2,980,548
PLASTER COMPOSITION

Archie Lee Hampton, Chicago, Ill., assignor to United States Gypsum Company, Chicago, Ill., a corporation of Illinois No Drawing. Filed Apr. 29, 1955, Ser. No. 505,045

4 Claims. (Cl. 106—111)

This invention relates to an improved plaster composition and more particularly to one containing a lightweight aggregate.

In the past, ordinary wall plaster has usually been made by job-mixing a calcined gypsum plaster with sand and water. It has been found that a much improved plaster can be made when a lightweight aggregate such as expanded perlite is used in place of the sand. The plaster is thus easier to apply and is light upon the hawk. Another outstanding advantage is that owing to the extreme lightness of the aggregate, the plaster and aggregate can be premixed at the plant and transported to the job without an excessive cartage cost. This "ready-mixed" plaster composition greatly facilitates job handling and also assures uniform and controlled quality. All that is required is a proper gauging of the plaster-aggregate mix with water.

There is, however, some difficulty in mixing plaster compositions containing a lightweight agregate with water to produce a lump free mortar, for in addition the resulting mortar is generally too rich and sticky for good mixing, application, and ease in darbying to a level surface. This harder mixing is due to the lightweight aggregates not providing the shear, cutting and dispersion of the plastic plaster-water mix such as obtained with sharp sand. A further contributing factor is that lower aggregate-plaster ratios are used with the lighter aggregates than with sand. If the above disadvantages could be overcome in a plaster formed from calcined gypsum and lightweight aggregate, a decided advance in the art would ensue.

It is therefore an object of this invention to set forth a plaster composition containing a lightweight aggregate which has improved mixing properties.

It is also an object of this invention to produce a plaster containing perlite or other lightweight aggregates which has certain outstanding improvements from the application standpoint.

Various other objects will readily occur to those skilled in the art of which this invention is a part.

"Ready-mix" plaster compositions formed by mixing a calcined gypsum plaster and a lightweight mineral aggregate are not new and are defined, for example, in A.S.T.M. specifications numbers C28–50 and C35–54T. Because it is economically possible to premix the plaster with the lightweight aggregate before shipping to the job and owing to the consequent lighter weight of mortar formed therefrom and the attendant lesser effort in application, plasters of this type have become very popular. While they are an improvement over sanded plaster, they still have certain mixing and application disadvantages as set forth above.

It has been found that these disadvantages can be removed and the above objects of this invention accomplished by mixing certain types of antifoaming agents with the mixture of calcined gypsum plaster and lightweight aggregate used. There are a number of antifoaming agents which are suitable for this purpose. One, which has been found well suited for the purpose, is tributyl phosphate and throughout the description of this invention it will serve as an example of a preferred embodiment; though other anti-foaming agents, which will be enumerated later, may also be used with varying results.

The plaster forming a part of the composition of this invention is made by calcining gypsum to form calcium sulfate hemihydrate such for example as by finely grinding and indirectly heating it in a kettle or the like or directly heating coarse particles of gypsum in a rotary kiln or calciner and subsequently grinding them to the proper fineness. In order to improve the plasticity of the plaster, the calcined gypsum is further ground with balls in a ball or tube mill. This grinding results in a plaster which when mixed with water is somewhat sticky. Such a type of plaster is highly desirable for mixing with an aggregate and applying to a surface. When sand or other heavy type aggregates are used, the stickiness is overcome and hence does not materially interfere with the mixing and application properties; but with a lightweight aggregate, such as perlite, such is not the case for there is insufficient body to the aggregate to overcome the stickiness so that mixing with water and spreading upon the wall are more difficult and hence full advantage of the lightweight aggregate cannot be realized. However, the advantages of both the plastic type of plaster and a lightweight aggregate can be obtained without the disadvantages by following the subject of this invention as will be subsequently more clearly set forth.

While most lightweight aggregates can be used in carrying out this invention, it is greatly preferred to use perlite, which term, when used throughout the description of this invention, is to be construed as meaning expanded perlite obtained by heating to a high temperature particles of hydrated siliceous volcanic glass mineral of this same name. The preparation of this type material while relatively new, is now well-known in the art and an exact description of its preparation is not necessary. An example of a suitable type of perlite which can be used in carrying out this invention is set forth in paragraphs 3 and 4 of A.S.T.M. C35–54T. Pertinent data contained in this reference are as follows:

Loose density _____ lbs./cu. ft.__ 7.5–12

U.S. Sieve retained:

| | | |
|---|---|---|
| No. 4 | percent__ | [1] 0 |
| No. 8 | do____ | [1] 0–5 |
| No. 16 | do____ | 10–45 |
| No. 30 | do____ | 45–85 |
| No. 50 | do____ | 75–95 |
| No. 100 | do____ | 88–100 |

[1] The above values are percent by volume and are obtained in accordance with the procedure set forth in paragraph 3a in the above-identified specification. The results are secured by screening 500 cc. loose for five minutes upon a mechanical sieving device. Each sieve fraction is then poured loosely into a 250 cc. graduated cylinder without tamping or shaking and leveling with a spatula if necessary, and read within 2 cc. The accumulative percentage retained upon each sieve is obtained by adding it to all of the larger fractions.

The following is a typical formula for a ready-mixed plaster made following this invention and is a preferred embodiment thereof:

Formula:

| | |
|---|---|
| Tubemilled calcined gypsum plaster | 2,000 lbs. |
| Perlite | 40 cu. ft. |
| Pressure hydrated dolomitic quicklime | 10 lbs. |
| Aluminum sulfate | 6 lbs. |
| Tributyl phosphate | 0.5 lb. |
| Commercial protein type retarder | As required to give desired set. |

The above formula may be varied appreciably, particularly in the ratio of the perlite to the calcined gypsum plaster; ranges of from about 20 to about 60 cu. ft. or higher, of the perlite per ton of the calcined gypsum plaster can be used.

The lime and aluminum sulfate, while not entirely essential, coupled with the commercial retarder, act to stabilize the set so as to minimize the influence of outside accelerative and retardative materials thereon. The amount of these ingredients can be varied so as to adjust the set for the conditions in various markets and for the plaster from the various gypsum deposits in a manner well-known in the industry. Any lime which will react with the aluminum sulfate to form calcium sulfate can be used. It has been found that the subject of this invention is particularly useful with sticky tube mill plasters, especially when they contain lime and aluminum sulfate used in effecting a stabilization of the set.

While tributyl phosphate is given in the above example of a preferred embodiment of this invention, it is not the intention to be limited thereby, for other material such as set forth in the following table can be used with varying results. Likewise, the invention is not to be limited to .5 lb. of material per ton of calcined gypsum plaster as set forth in the above formula, for lesser and obviously greater quantities such as as much as 5 lbs. per ton or more can be used. The optimum concentration for most effective use can readily be determined by trial.

Without limiting the invention to any particular theory, it is believed from the information contained in the above table and from a great number of trials, that the necessary characteristics of the material required to give the improvement in mixing and application properties forming the subject of this invention is one which will cause a rapid wetting of the ingredients. This may also be coupled with certain antifoaming properties hence throughout the forthcoming claims, such type of material will be referred to as a wetting-antifoam material and will be construed to mean any material which, when mixed with a calcined gypsum plaster-lightweight aggregate composition, will improve the mixing and application properties thereof. The words may not necessarily connote the same properties as when they are used by other industries. Obviously also of importance is the fact that the material must not be adversely affected by the calcium or sulfate ions or other material present in the plaster.

The wetting-antifoaming agent or material is added to the mixer in which the dry ingredients, such as listed in the above formula, are blended together. If in liquid form, it can be dripped or poured in a small steady stream into the mixer during mixing until completely dispersed therein. It is also possible to introduce the liquid in dry form by first adding it to a powdered carrier. While it is much preferred to mix the wetting antifoaming agent into the dry ingredients in the manner referred to

| Trade Marks and Suppliers | Material | Wetting-Mixing Qualities | Antifoaming Qualities | Application Properties |
|---|---|---|---|---|
| Victor Chemical Co.: | Tributyl phosphate | Ex. | Ex. | Ex. |
| Victawet 12 | Tripropyl phosphate | Good. | Good. | Good. |
| | $R-O-P=O$ with $OR'$ groups, where R is a medium chain alkyl group and R' is a water solubilizing group. | Ex. | Ex. | Ex. |
| Dow Chemical Co.: | | | | |
| Polyglycol P-1200' | A condensed polymer of propylene glycol having a molecular weight of about 1,200. | Ex. | Ex. | Ex. |
| E. I. du Pont: | | | | |
| Ocenol | Technical oleyl alcohol | Good. | Good. | Good. |
| Dupanol OS | An amine salt of lauryl alcohol sulfate blended with a higher fatty alcohol. | Good. | Good. | Good. |
| Antifoam LF | Octyl alcohol | Ex. | Ex. | Ex. |
| Lorol 20 | N. octanol | Good. | Ex. | Good. |
| Lorol 22 | N. decanol | Good. | Ex. | Good. |
| Wyandotte Chemical Co.: | | | | |
| Pluronics L62 | A condensate of ethylene oxide formed by condensing propylene oxide with propylene glycol. | Good. | Good. | Good. |
| Hercules Chemical Co.: | | | | |
| Defoamer 33S | An ester of a high molecular weight alcohol and a high molecular weight fatty acid. | Good. | Good. | Good. |
| National Aluminate Corp.: | | | | |
| Nalco X199 | A mixture of polyoxyalkylene glycols and esters. | Good. | Good. | Good. |
| Nalco 71-D5 | A liquid mixture of polyglycol and fatty acid type of surface active agent. | Good. | Good. | Good. |
| Nalco X-173-(-212) | A blend of condensed polyalcohols and fatty esters, and | V. good. | V. good. | V. good. |
| Commercial Solvents Corp.: | | | | |
| Alkaterge A | An oxazoline with a substituted amino hydroxy group. | Ex. | Ex. | Ex. |
| Alkaterge C | Same | Ex. | Ex. | Ex. |
| Alkaterge E | Same | Ex. | Ex. | Ex. |

In preparing the data listed in the above table, a concentration of 0.5 lb. of wetting-antifoaming agent per ton of calcined gypsum plaster was used. With an increase in concentration, the rating of some of the materials may change from good to excellent. All, however, gave a noticeable improvement. Some were added to the plaster composition while others were added to the gauging water before mixing. No marked difference was detected in the results obtained from the two methods of addition.

above, it is also within the ambit of this invention to add the wetting-anitfoaming agent to the gauging water before the perlite-calcined gypsum plaster. It is also within the scope of this invention to job mix the plaster composition materials, though it is much preferred to mix everything at the plant.

It is also within the scope of this invention to use other types of lightweight aggregates, for example expanded vermiculite, in place of perlite. Hence in the above example, the perlite contained therein can be replaced by expanded vermiculite and the mixing and application properties will be improved by the addition of the wetting-antifoaming agents or materials referred to above.

To recapitulate, this invention comprises the improvement of the mixing and application properties of a plaster composition containing a lightweight aggregate, such as perlite, and calcined gypsum plaster, which is plastic and somewhat sticky, by the addition of a wetting-antifoaming agent, such as outlined above and of which tributyl phosphate is an example, preferably to the plaster-aggregate mix, but also the gauging water itself if desired.

Also, the gauged plaster composition formed following this invention will be found to overcome to a certain extent the tendency of gypsum plaster composition containing a lightweight aggregate to stiffen and to require additional water or restore the desired consistency, when placed upon the board. Such is not due to setting, but to the inherent characteristics of the mixture.

Although there has been disclosed a practical embodiment of this invention and specific example, and uses which are given to insure a clear understanding of the essence of this invention, it is not the intention to be limited thereby for obviously many variations may be made by those skilled in the art and still be within the scope of this invention which is only limited by the forthcoming claims.

I claim:

1. In the process of overcoming the difficulty of mixing and spreading a plastic sticky mortar formed from a mixture of water, a highly plastic calcium sulfate hemihydrate and a lightweight granular aggregate selected from the group consisting of expanded perlite and expanded vermiculite the improvement comprising introducing a wetting-antifoaming agent into said mortar prior to spreading.

2. An improved plaster composition for application to walls and ceilings when gauged with water to form a plastic mortar, consisting essentially of as the active ingredients: a lightweight granular aggregate selected from the group consisting of expanded perlite and expanded vermiculite, calcium sulfate hemihydrate of sticky plasticity when mixed with water and a wetting-antifoaming agent.

3. An improved plaster composition for application to walls and ceilings when gauged with water to form a plastic mortar consisting essentially of as the active ingredients: expanded perlite, calcium sulfate hemihydrate of sticky plasticity when mixed with water and a wetting-antifoaming agent.

4. In combination, a highly plastic sticky calcium sulfate hemihydrate, a lightweight granular aggregate selected from the group consisting of expanded perlite and expanded vermiculite, and wetting-antifoaming means for decreasing the difficulty of mixing and spreading of a plastic mortar formed when said combination is gauged with water.

References Cited in the file of this patent

UNITED STATES PATENTS

| | | |
|---|---|---|
| 2,198,800 | Badollet | Apr. 30, 1940 |
| 2,351,109 | Corwin et al. | June 13, 1944 |
| 2,382,561 | Gregory | Aug. 14, 1945 |
| 2,634,208 | Miscall et al. | Apr. 7, 1953 |
| 2,662,024 | Riddell et al. | Dec. 8, 1953 |
| 2,715,583 | Ziegler | Aug. 16, 1955 |